(12) United States Patent
Nakagawa et al.

(10) Patent No.: US 11,467,908 B2
(45) Date of Patent: Oct. 11, 2022

(54) DISTRIBUTED STORAGE SYSTEM, DISTRIBUTED STORAGE NODE, AND PARITY UPDATE METHOD FOR DISTRIBUTED STORAGE SYSTEM

(71) Applicant: HITACHI, LTD., Tokyo (JP)

(72) Inventors: Kazushi Nakagawa, Tokyo (JP); Mitsuo Hayasaka, Tokyo (JP); Yuto Kamo, Tokyo (JP)

(73) Assignee: HITACHI, LTD., Tokyo (JP)

( * ) Notice: Subject to any disclaimer, the term of this patent is extended or adjusted under 35 U.S.C. 154(b) by 260 days.

(21) Appl. No.: 16/807,724

(22) Filed: Mar. 3, 2020

(65) Prior Publication Data
US 2021/0157676 A1    May 27, 2021

(30) Foreign Application Priority Data

Nov. 26, 2019   (JP) .............................. JP2019-213354

(51) Int. Cl.
| | |
|---|---|
| *G06F 11/00* | (2006.01) |
| *G06F 11/10* | (2006.01) |
| *G06F 11/30* | (2006.01) |
| *G06F 3/06* | (2006.01) |

(52) U.S. Cl.
CPC .......... *G06F 11/1096* (2013.01); *G06F 3/067* (2013.01); *G06F 3/0619* (2013.01); *G06F 3/0635* (2013.01); *G06F 3/0689* (2013.01); *G06F 11/3034* (2013.01); *G06F 2211/1028* (2013.01)

(58) Field of Classification Search
CPC ............ G06F 11/1096; G06F 11/3034; G06F 3/0619; G06F 3/067; G06F 3/0689; G06F 2211/1028
See application file for complete search history.

(56) References Cited

U.S. PATENT DOCUMENTS

| | | | | |
|---|---|---|---|---|
| 5,778,426 | A * | 7/1998 | DeKoning | G06F 12/0866 711/122 |
| 6,708,258 | B1 * | 3/2004 | Potter | G06F 13/385 710/52 |
| 2011/0202722 | A1 * | 8/2011 | Satran | G06F 11/1076 711/114 |
| 2013/0230629 | A1 * | 9/2013 | Hathuc | A23J 3/14 426/519 |
| 2016/0034186 | A1 * | 2/2016 | Weiner | G06F 3/061 710/74 |
| 2017/0077961 | A1 | 3/2017 | Blaum et al. | |
| 2017/0097875 | A1 | 4/2017 | Jess et al. | |
| 2021/0157676 | A1 * | 5/2021 | Nakagawa | G06F 3/0635 |

* cited by examiner

*Primary Examiner* — Philip Guyton
(74) *Attorney, Agent, or Firm* — Volpe Koenig

(57) ABSTRACT

A distributed storage places data units and parity units constituting a stripe formed by divided data into storage nodes in a distributed manner. In reference to determination formulas, either a full-stripe parity calculation method or an RPM parity calculation method is selected so as to minimize an amount of network traffic.

7 Claims, 15 Drawing Sheets

| # | Item | value |
|---|---|---|
| 1 | File name | /home/tarou/abcd.txt |
| 2 | Placement Group | 1234 |
| 3 | data units of a stripe | k=8 |
| 4 | parity units of a stripe | m=2 |
| 5 | Correction Code | Reed-Solomon |

| # | Placement Group | Data placement |
|---|---|---|
| 1 | 123 | D1: Node #1, drive #1<br>D2: Node #2, drive #1<br>P1: Node #3, drive #1<br>... |
| 2 | 456 | D1: Node #1, drive #2<br>... |
| : | : | : |
| N | xxx | D1: Node #x, drive #y<br>... |

FIG. 11

| Case | Data placement condition | | | Parity calc. method | Int. parity calc. node | | Network traffic |
|---|---|---|---|---|---|---|---|
| | Old D in I/O reception node | Old P in I/O reception node | Not updated D in I/O reception node | | | | |
| (A) | – | – | – | RMW parity calc. | (a-1-int.P) | I/O reception node | 2w+m |
| | | | | | (a-2-int.P) | Node storing Old D | 3w+m-2 |
| | | | | | (a-3-int.P) | Node storing Old P | 3w+m-1 |
| | | | | | (a-4-int.P) | Node other than the above | 3w+m |
| (B) | ○ | – | – | | (b-1-int.P) | I/O reception node | 2w+m-2 |
| | | | | | (b-2-int.P) | Node storing Old D | 3w+m-3 |
| | | | | | (b-3-int.P) | Node storing Old P | 3w+m-2 |
| | | | | | (b-4-int.P) | Node other than the above | 3w+m-1 |
| (C) | – | ○ | – | | (c-1-int.P) | I/O reception node | 2w+m-1 |
| | | | | | (c-2-int.P) | Node storing Old D | 3w+m-2 |
| | | | | | (c-3-int.P) | Node storing Old P | 3w+m-1 |
| | | | | | (c-4-int.P) | Node other than the above | 3w+m |
| (D) | – | – | ○ | | (d-1-int.P) | I/O reception node | 2w+m-2 |
| | | | | | (d-2-int.P) | Node storing Old D | 3w+m-2 |
| | | | | | (d-3-int.P) | Node storing Old P | 3w+m-1 |
| | | | | | (d-4-int.P) | Node other than the above | 3w+m |

| Case | (k-m) conditional expression | Full stripe parity calc. conditional expression |
|---|---|---|
| (A) | k-m>=4 | w>(k-m)/2 |
|  | k-m<4 | w>(k-m+2)/3 |
| (B) | k-m>=1 | w>(k-m+1)/2 |
|  | k-m<1 | w>(k-m+2)/3 |
| (C) | k-m>=-1 | w>(k-m+1)/2 |
|  | k-m<-1 | w>(k-m+1)/3 |
| (D) | k-m>=5 | w>(k-m-1)/2 |
|  | k-m<5 | w>(k-m+1)/3 |

| Case | (k-m) conditional expression | Full stripe parity calc. conditional expression |
|---|---|---|
| (A) | k>=4 | w>k/2 |
|  | k<4 | w>(k+2)/3 |
| (B) | - | w>(k+1)/2 |
| (C) | k>=2 | w>k/2 |
|  | k<2 | w>(k+1)/3 |
| (D) | k>=5 | w>(k-1)/2 |
|  | k<5 | w>(k+1)/3 |

| Case | w conditional expression | Parity calc. location |
|---|---|---|
| (A) | w>=2 | I/O reception node |
| | w==1 | node storing old D or old P |
| (B) | - | I/O reception node |
| (C) | - | I/O reception node |
| (D) | w>=2 | I/O reception node |
| | w==1 | node storing old D or old P |

| Case | w conditional expression | Parity calc. location |
|---|---|---|
| (A) | w>=2 | I/O reception node |
| | w==1 | node storing old D |
| (B) | - | I/O reception node |
| (C) | - | I/O reception node |
| (D) | w>=2 | I/O reception node |
| | w==1 | node storing old D |

DISTRIBUTED STORAGE SYSTEM, DISTRIBUTED STORAGE NODE, AND PARITY UPDATE METHOD FOR DISTRIBUTED STORAGE SYSTEM

BACKGROUND OF THE INVENTION

1. Field of the Invention

The present invention relates to a distributed storage system, a distributed storage node, and a parity update method for the distributed storage system.

2. Description of the Related Art

There are two types of data, i.e., information technology (IT) data and operational technology (OT) data, which are handled in data analysis and by artificial intelligence (AI). The IT and OT data cover a broad range of data types including sensor data, log files, images, moving images, sounds, and office document files. The storage that holds these types of data in a unified manner is referred to as data lake.

The data lake includes multiple server nodes and implemented with a distributed storage in which data is arranged in a distributed manner for scalability and for load leveling between the nodes. The distributed storage protects the stored data using erasure coding (EC). The EC is a data protection technology that enables data to be recovered using error correction codes at the time of a node failure. In principle, the EC is a technology that applies the redundant arrays of inexpensive disks (RAID) 5/6 technology, which has been used to protect data at the time of a drive failure in a server, to the protection of the data stored between nodes.

US 2017/0097875 discloses a method in which, if data is unrecoverable by a first data protection schema at the time of a storage device failure in a distributed storage system, the data is recovered by a second data protection schema from a second data chunk in another node.

US 2017/0077961 discloses a method in which the frequency of access to data in a distributed storage is referenced so as to adaptively select either an EC option with low recovery cost or an EC option with low storage cost.

SUMMARY OF THE INVENTION

In the distributed storage system, however, the EC for use in data protection has problems with the performance of update writes. To update erasure-coded (EC) data requires recalculation of parity data, which reduces update performance. In particular, in a case where the update size is small, read-modify-write (RMW) operations occur both on the original data and on the parity data. The RNW incurs large amounts of network traffic between nodes.

Neither US 2017/0097875 nor US 2017/0077961 cited above discloses any method of improving write performance at the time of updating the erasure-coded data.

The present invention has been made in the above circumstances and provides as an object a distributed storage system capable of improving the write performance at the time of updating erasure-coded data, a distributed storage node, and a parity update method for use with the distributed storage system.

In achieving the above object and according to a first aspect of the present invention, there is provided a distributed storage system that includes a processor, and a plurality of nodes having a storage drive each A stripe is constituted by data units and by parity units for recovering the data units. Each of the units making up each stripe is stored on the storage drive of a different node. In a case where an update write is performed on the data units of a given stripe, the parity units in the same stripe is updated. The distributed storage system is configured to perform a first parity update method of calculating and updating the parity units based on all data units in the stripe having undergone the update write, and a second parity update method of calculating and updating the parity units based on the data units having undergone the update write and on the data units and the parity units preceding the update write; and the distributed storage system is further configured to switch between the first parity update method and the second parity update method based on an amount of data traffic between the nodes involved in the parity update.

The present invention outlined above makes it possible to improve the write performance at the time of updating erasure-coded data.

BRIEF DESCRIPTION OF THE DRAWINGS

FIG. 3 is a view depicting an example of EC information in FIG. 2;

FIG. 4 is a view depicting an example of map information in FIG. 2;

FIG. 11 is a tabular diagram listing amounts of network traffic using intermediate parity at the time of switching between data placement conditions and between parity calculation nodes with the distributed storage system according to the embodiment;

FIG. 12 is a tabular diagram listing conditions for switching between parity calculation methods with the distributed storage system according to the embodiment;

FIG. 13 is a tabular diagram listing conditions for switching between parity calculation methods at the time of using intermediate parity with the distributed storage system according to the embodiment;

FIG. 14 is a tabular diagram listing conditions for switching between parity calculation nodes with the distributed storage system according to the embodiment; and FIG. 15 is a tabular diagram listing conditions for switching between parity calculation nodes at the time of using intermediate parity with the distributed storage system according to the embodiment.

DESCRIPTION OF THE PREFERRED EMBODIMENT

The preferred embodiment of the present invention is described below with reference to the accompanying drawings. It is to be noted that the embodiment to be explained below is not limitative of the present invention as claimed by the appended claims and that not all constituents or their combinations explained in conjunction with the embodiment are indispensable as the means for solving the above-mentioned problems.

Figure 1:
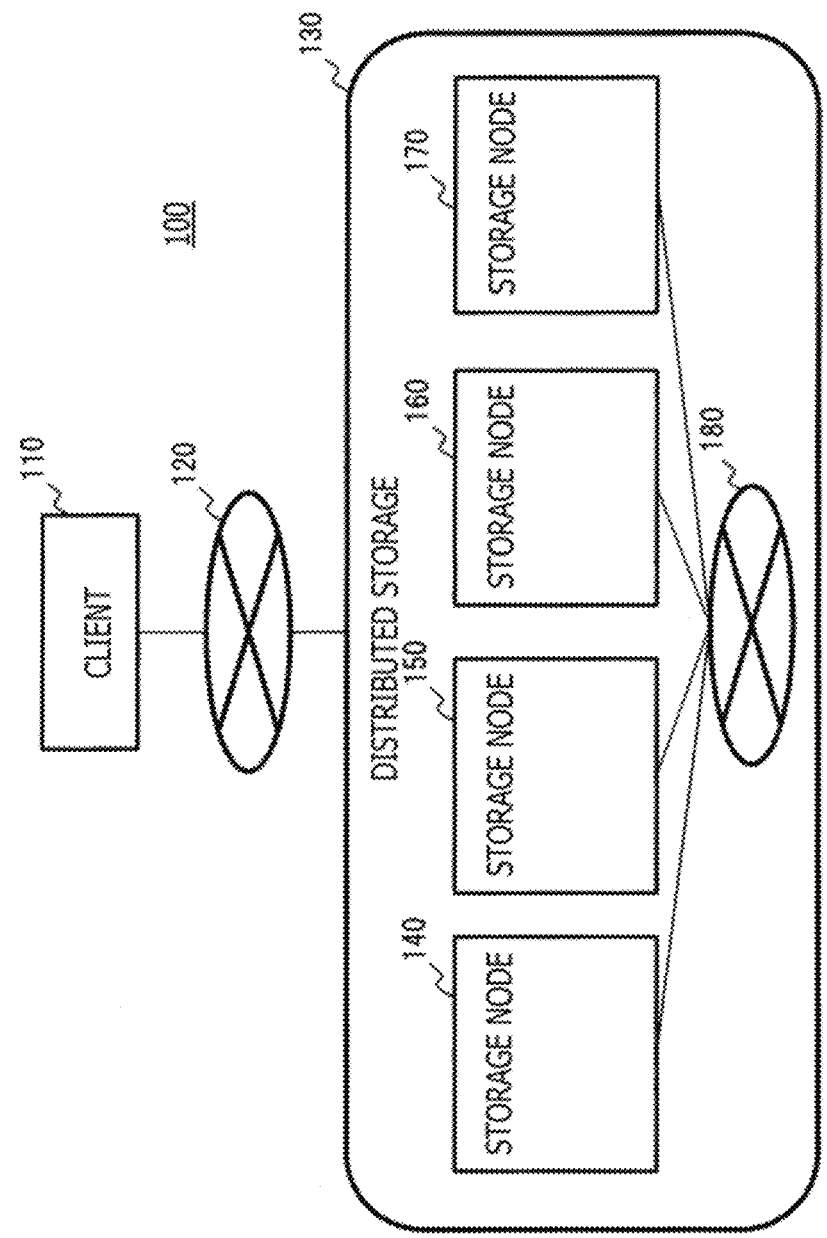
FIG. 1 is a block diagram depicting an exemplary configuration of a distributed storage system according to an embodiment.

FIG. 1 is a block diagram depicting an exemplary configuration of a distributed storage system according to the embodiment. In FIG. 1, a distributed storage system 100 includes one or multiple clients 110, a distributed storage 130, and a front-end network 120. The client 110 and the distributed storage 130 are connected with one another via the front-end network 120. The client 110 sends I/O requests (data read or write requests) to the distributed storage 130. The distributed storage 130 processes the I/O requests from the client 110. The client 110 may be a host server, for example.

The distributed storage 130 includes multiple storage nodes 140 to 170 placed in a distributed manner and a back-end network 180. The storage nodes 140 to 170 may be a distributed file system (FS) server each, for example. The distributed storage 130 has a cluster configuration with the multiple storage nodes 140 to 170 interconnected via the back-end network 180. The multiple storage nodes 140 to 170 constitute a distributed file system that provides file system functions for the client 110.

One of the storage nodes 140 to 170 making up the distributed storage 130 acts as an I/O reception node that receives I/O requests from the client 110 and performs I/O processing accordingly. At the time of I/O processing, data and control data are transferred between the storage nodes 140 to 170 via the back-end network 180.

The front-end network 120 and the back-end network 180 may each be a wide area network (WAN) such as the Internet, a local area network (LAN) such as Wi-Fi or Ethernet (registered trademark), or a combination of WAN and LAN. The front-end network 120 and the back-end network 180 may have a common configuration.

The distributed storage 130 protects data using erasure coding (also referred to as EC). In an EC setup, data units and parity units constituting a stripe formed by divided data are placed in the storage nodes 140 to 170 in a distributed manner. The data units and the parity units may be stored in different storage nodes depending on the stripe of each file data.

In this setup, depending on the data traffic (which may be referred to as the amount of network traffic hereunder) between the storage nodes 140 to 170 at the time of an update write, the distributed storage 130 switches between a method of calculating parity based on all data units making up a stripe (the method may be referred to as the full-stripe parity calculation method hereunder) and a method of calculating party based on a part of the data units making up a stripe (the method may be referred to as the RMW parity calculation method hereunder).

At this point, the distributed storage 130 may select either the full-stripe parity calculation method or the RMW parity calculation method so as to minimize the amount of network traffic. Selecting the method helps reduce the network use bandwidth at the time of an update write of erasure-coded data and improve the write performance at the time of an update of erasure-coded data.

Figure 2:
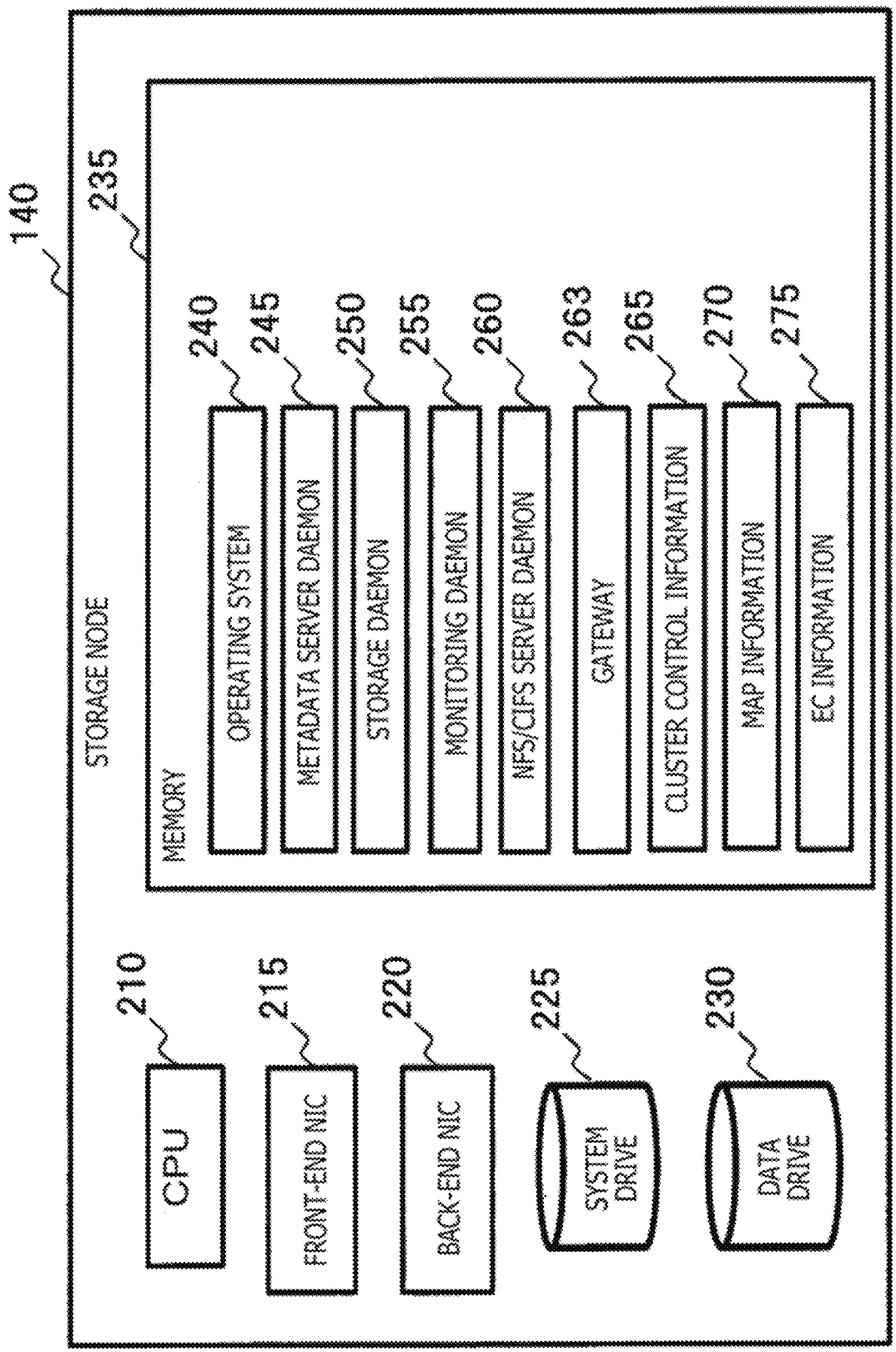
FIG. 2 is a block diagram depicting an exemplary configuration of a storage node in FIG. 1.

FIG. 2 is a block diagram depicting an exemplary configuration of one storage node in FIG. 1. Whereas FIG. 2 depicts as an example the storage node 140 in FIG. 1, the other storage nodes 150 to 170 may also be configured similarly.

In FIG. 2, the storage node 140 includes a central processing unit (CPU) 210, a front-end network interface card (NIC) 215, a back-end NIC 220, a system drive 225, one or multiple data drives 230, and a memory 235.

The CPU 210 loads and executes programs in the memory 235. The CPU 210 communicates with the other storage nodes 150 to 170 and with the client 110 via the front-end INC 215 and the back-end NIC 220 using Ethernet or Infiniband (registered trademark), for example.

The system drive 225 stores an operating system (OS) 240, control programs, and control information tables. The data drive 230 stores file data. Note that the distributed storage 130 may retain the control information tables in the form of file data. The drives may each be a hard disk drive (HDD) or a solid-state drive (SSD), for example, and are connected with the CPU 210 via an interface such as Serial Attached SCSI (SAS), Serial Advanced Technology Attachment (SATA), or PCIe.

Loaded into the memory 235 are control programs such as the OS 240, a metadata server daemon 245, a storage daemon 250, a monitoring daemon 255, an NFS/CIFS server daemon 260, and a gateway 263, and control information tables such as cluster control information 265, map information 270, and EC information 275.

The metadata server daemon 245 is a process that manages file metadata necessary for the distributed storage 130 to provide file server functions. The storage daemon 250 is a process that manages the data drive 230 and performs data read and write operations on that data drive. The monitoring daemon 225 is a process that manages cluster configuration information regarding a cluster configuration formed by multiple storage nodes. The NFS/CIFS server daemon 260 is a process that provides network file sharing services based on the Network File System (NFS) protocol or on the Common Internet File System (CIFS) protocol.

The gateway 263 is a process that receives an I/O request from the client 110, handles the received I/O request by communicating with the own storage node 140 and with the storage daemons 250 of the other storage nodes 150 to 170, and returns a response to the client 110.

The cluster control information 265 includes the IP addresses (or domain names) of the storage nodes constituting clusters, IP addresses for communicating with the control processes such as the storage daemon 250, configuration information such as port numbers, and authentication information necessary for communication between the storage nodes. The map information 270 constitutes a control information table indicative of the storage locations of file data in the distributed storage 130. The EC information 275 is another control information table that has EC-related information such as error correction code types regarding the stored file data.

When one of the multiple storage nodes 140 to 170 constituting the distributed storage 130 receives a request for a write from the client 110, that node acts as an I/O reception node that receives the write request. The write request includes path information indicating the storage locations of the file data and file to be written.

Upon receiving a request for a write of file data, the gateway 263 divides the file data into multiple data units, generates parity units from the data units, and stores the data units and the parity units into the multiple storage nodes 140 to 170 in a distributed manner.

When generating the parity units, the gateway 263 switches between the full-stripe parity calculation method and the RMW parity calculation method depending on the amount of network traffic.

According to the full-stripe parity calculation method, upon receiving a request for a write of new file data, for example, the gateway 263 divides the file data into four data units named new D1, new D2, new D3, and new D4, and in a case where newly calculated parity units are named new P1 and new P2, the new P1 and new P2 are calculated by calculating RS [new D1, new D2, new D3, new D4]. In this case, the expression "RS [ ]" represents error correction coding that may be typically the Reed-Solomon coding or the like. Some other suitable coding method may alternatively be used instead. The gateway 263 stores the new D1, new D2, new D3, new D4, new P1, and new P2 into the multiple storage nodes 140 to 170 in a distributed manner.

In another example of the full-stripe parity calculation method, upon receiving a request for a partial update write of existing file data, and assuming that the partial update data is defined as new D1, the gateway 263 reads the remaining not-updated data D2, D3, and D4 constituting a stripe, and generates new P1 and new P2 by calculating RS [new D1, D2, D3, D4]. The gateway 263 then updates old D1, old P1, and old P2 based on the new D1, new P1, and new P2.

According to the full-stripe parity calculation method, as described above, the partial update write may incur readout of the remaining data units that are not updated and constitute the stripe (the units may be referred to as the not-updated data units or data units not to be updated, hereunder), generating large amounts of network traffic between the storage nodes 140 to 170.

In a case where a write request is received for an overwrite update of existing file in the storage nodes 140 to 170 (the request may be referred to as the update write request hereunder), the gateway 263 generates new parity units from the not-updated old data units, from the old parity units, and from the new data units; updates the new data units and the new parity units, and stores these new units according to the RMW parity calculation method. For example, assuming that the old data unit is old D1, that the old parity units are old P1 and old P2, and that the new data unit is new D1, the gateway 263 generates the new P1 and new P2 by calculating RS [new D1, old D1, old P1, old P2]. On the basis of the new D1, new P1, and new P2, the gateway 263 updates the old D1, old P1, and old P2, respectively.

According to the new RMW parity calculation method, as described above, the new parity units are calculated by reading out the old data units and the old parity units. Thus, RMW may occur both on the original data and on the parity data and may generate large amounts of network traffic between the storage nodes 140 to 170.

Here, qualitatively, in a case where the update size is small at the time of an update write (i.e., where the number of update data units is small), the number of not-updated data units is relatively large according to the full-stripe parity calculation method. The amount of network traffic is thus larger with the full-stripe parity calculation method than with the RMW parity calculation method. For this reason, in a case where the update size is small, the full-stripe parity calculation method is replaced with the RMW parity calculation method to make the amount of network traffic smaller than in the case of the full-stripe parity calculation method. Also, in a case where the update size is large at the time of an update write, the RMW parity calculation method entails relatively large numbers of old data units and old parity units to be read out. Thus, the RMW parity calculation method is replaced with the full-stripe parity calculation method to make the amount of network traffic smaller than in the case of the RMW parity calculation method.

FIG. 3 is a view depicting an example of the EC information in FIG. 2.

In FIG. 3, an EC information table 275 includes file names, placement groups, the number of data units of each stripe, the number of parity units of each stripe, and error correction code type entries.

The file name that names a file includes file path information. The placement group is information regarding the placement of storage node data of the file of interest. For example, the placement group is a value generated from the hash value of the file name or from the i-node number of the file and corresponds to a group number indicating a group of the node data placed in a stripe. The error correction code type is information regarding the type of coding such as the Reed-Solomon code or horizontal and vertical parity code. The EC information 275 may be retained in units of files, directories, or file systems.

FIG. 4 is a view depicting an example of the map information in FIG. 2.

In FIG. 4, the map information table 270 describes corresponding relations between placement groups and data placement information regarding the file data belonging to each placement group. The map information table 270 includes placement group entries and data placement information entries.

The data placement information concerns a storage node number and either an intra-storage node drive number or a storage daemon identification number. The data placement information indicates where the data units and parity units of file data are placed.

Figure 5:
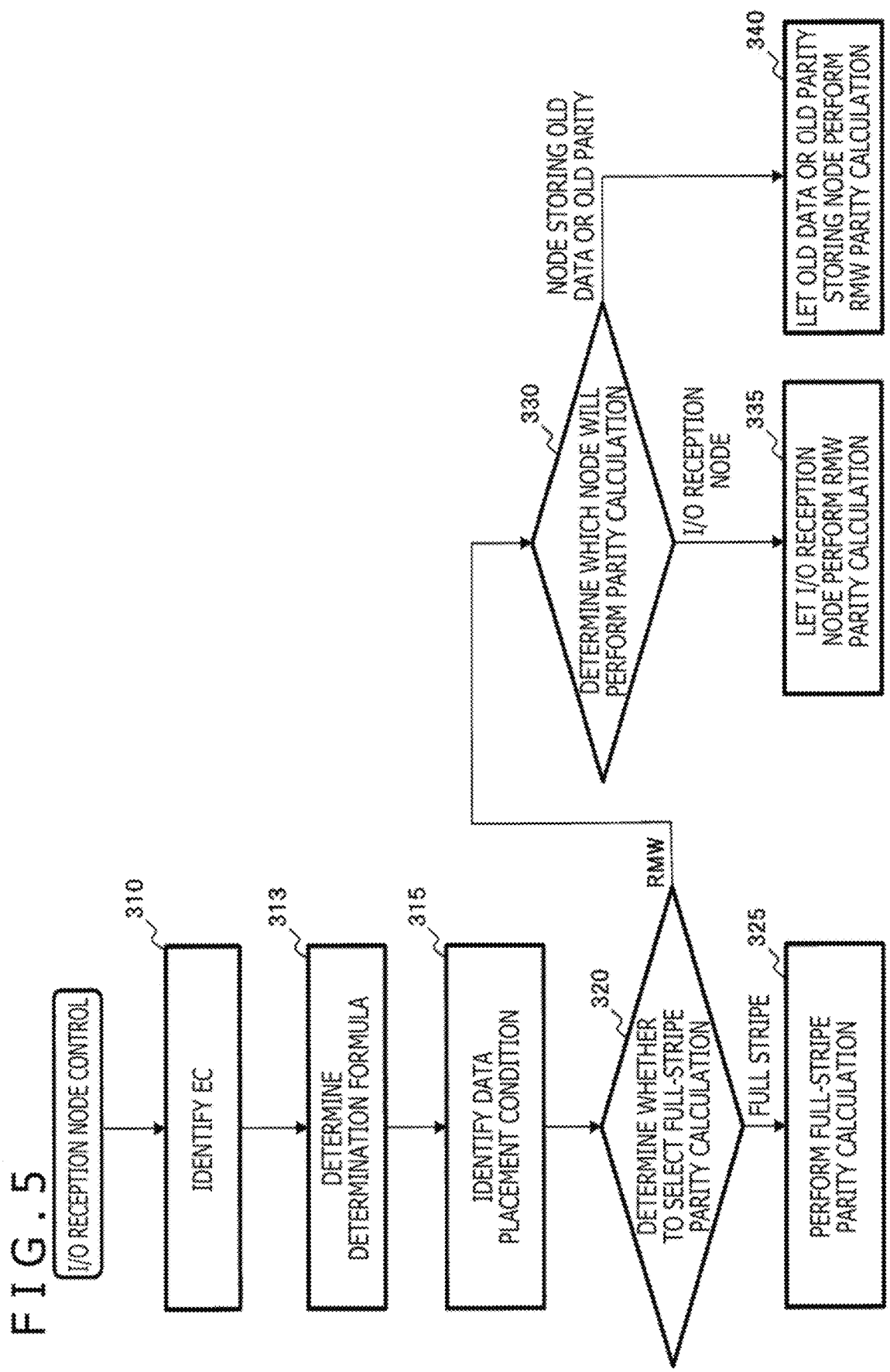
FIG. 5 is a flowchart depicting a method of switching between parity calculation options with the distributed storage system according to the embodiment.

FIG. 5 is a flowchart depicting a method of switching between parity calculation methods with the distributed storage system according to the present embodiment.

In FIG. 5, the storage node 140 in FIG. 1 is assumed to be the I/O reception node receiving an I/O request from the client 110. In this case, the gateway 263 in FIG. 2 searches for and identifies the EC information 275 regarding write target data (310).

The gateway 263 then determines from the EC information 275 a determination formula for switching between the full-stripe parity calculation method and the RMW parity calculation method (313). The determination formula can be obtained from the result of comparison between the amount of network traffic necessary for the full-stripe parity calculation at the time of an update write on one hand and the amount of network traffic required for the RMW parity calculation at the time of the update write on the other hand. The amount of network traffic varies with the data placement condition of the I/O reception node that receives update write requests. For this reason, the determination formula can be obtained for each data placement condition. Also, under each data placement condition, the amount of network traffic varies with the storage node that performs parity calculation. Thus, the determination formula can be obtained for each storage node that performs parity calculation. Note that the data placement condition varies with each file data, because the nodes differ in which data units and parity units are stored depending on the stripe of each file data.

In a case where intermediate parity is used in the RMW parity calculation, the amount of network traffic is made smaller than a case where the intermediate parity is not used. Thus, in a case where the intermediate parity is usable, the determination formula that uses the intermediate parity can be used in switching between the parity calculation methods.

Next, the gateway 263 identifies the data placement condition from the map information table 270 and from the EC information 275 (315).

On the basis of the determination formula determined in step 313, the gateway 263 then determines whether to switch to the full-stripe parity calculation method or to the RMW parity calculation method (320). At this point, the gateway 263 selects the method involving the smaller amount of network traffic between the storage nodes 140 to 170. In a case where the full-stripe party calculation method is selected as a result of the determination, parity units are calculated from all data units constituting the stripe (325).

In contrast, in a case where the RMW party calculation method is selected as a result of the determination in step 320, the gateway 263 determines which storage node will perform the RMW parity calculation (330). At this point, the gateway 263 selects parity calculation with the storage node having a small amount of network traffic between the storage nodes 140 to 170.

In a case where it is determined that the I/O reception node will perform parity calculation, the I/O reception node is caused to perform the RMW parity calculation (335).

In contrast, in a case where it is determined that a node storing an old data unit or an old parity unit will perform parity calculation, the old data unit-storing node or the old parity unit-storing node is caused to perform the RMW parity calculation (340).

What follows is a specific explanation of some examples of the method for calculating the amount of network traffic between the storage nodes.

Figure 6:
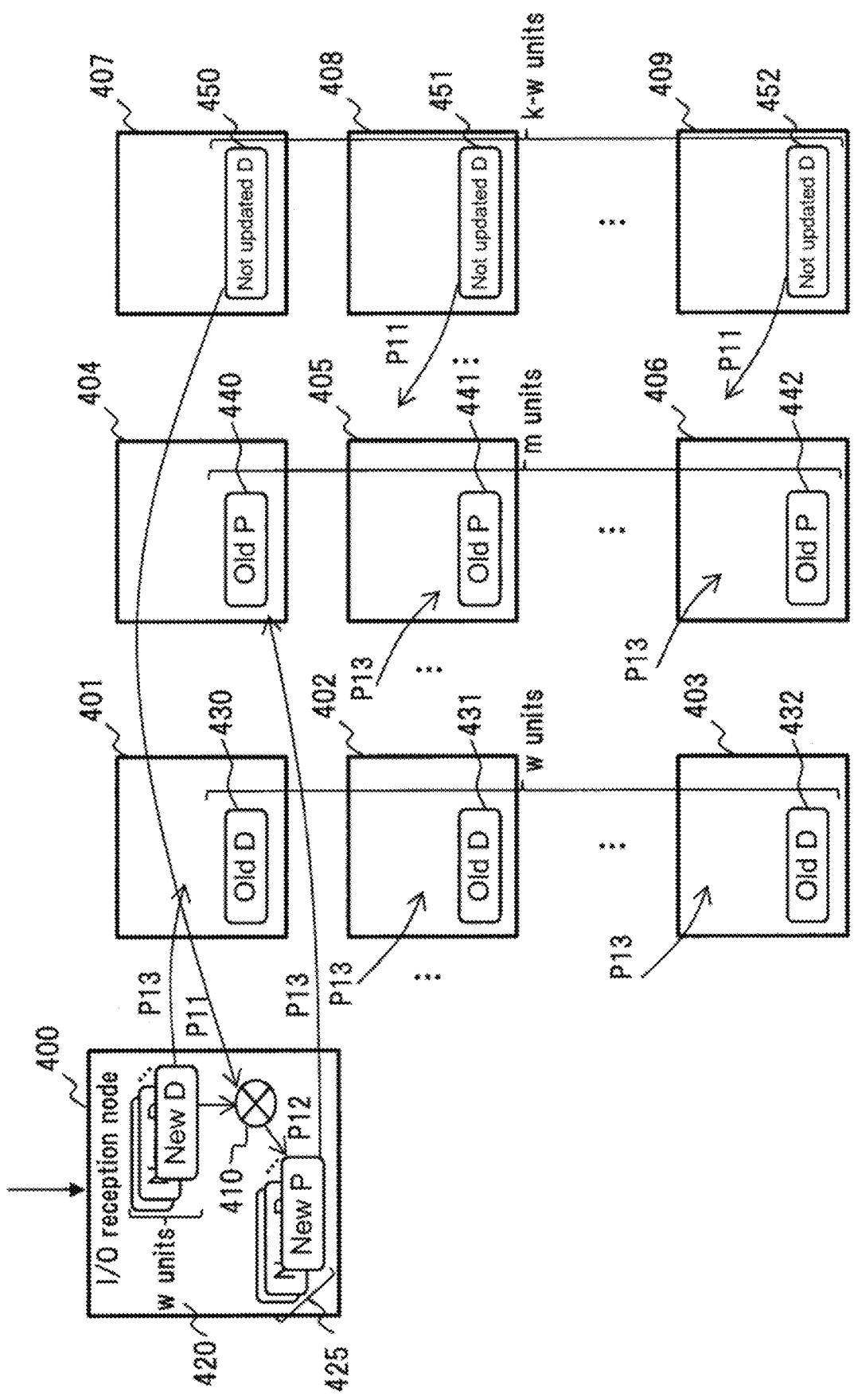
FIG. 6 is a block diagram depicting an exemplary method of calculating an amount of network traffic at the time of full-stripe parity calculation with the distributed storage system according to the embodiment.

FIG. 6 is a block diagram depicting an exemplary method of calculating the amount of network traffic at the time of full-stripe parity calculation with the distributed storage system according to the present embodiment.

In FIG. 6, multiple storage nodes 400 to 409 constitute a cluster. The storage node 400 is assumed to be the I/O reception node. It is also assumed that the storage nodes 401 to 403 store old data units (old Ds) 430 to 432 related to a given write I/O request, that the storage nodes 404 to 406 store old parity units (old Ps) 440 to 442 related to the write I/O request, and that the storage nodes 407 to 409 store not-updated data units (not-updated Ds) related to the write I/O request. FIG. 6 does not depict any storage node not related to the write I/O request.

It is further assumed that the storage node 400 acting as the I/O reception node does not include old data units, old parity units, or not-updated data units. The not-updated data units are data units that are not to be updated by the write I/O request from among the data units constituting the stripe. One stripe is assumed to be configured with k (a positive integer) data units and m (a positive integer) parity units. The write I/O request being issued is assumed to involve an update write of w (a positive integer) data units (new Ds) 420. In this case, there are (k−w) not-updated data units. Here, the storage node 400 acting as the I/O reception node is assumed to be the storage node that performs parity calculation. The storage node 400 includes an encoder 410.

The storage node 400 identifies the EC information and the data placement condition regarding the stripe. Upon determining that the full-stripe parity calculation is to be selected, the storage node 400 performs I/O processing as follows:

(P11): The storage node 400 transfers (k-w) not-updated data units 407 to 409 to the I/O reception node.

(P12): The encoder 410 is caused to calculate m new parity units (new Ps) 425 from the full stripe covering w new data units 420 and (k−w) not-updated data units 407 to 409.

(P13): The storage node 400 transfers the w new data units 420 and the m new parity units 425 to the respective storage nodes for update operations.

When the amount of data per data unit is assumed to be 1, the amount of network traffic of (k−w) not-updated data units 407 to 409 is (k−w), the amount of network traffic of the new data units 420 is w, and the amount of network traffic of the new parity units 425 is m. Thus, the total network traffic over the network between the storage nodes 400 to 409 as a result of the above I/O processing amounts to (k−w)+w+m=k+m.

Figure 7:
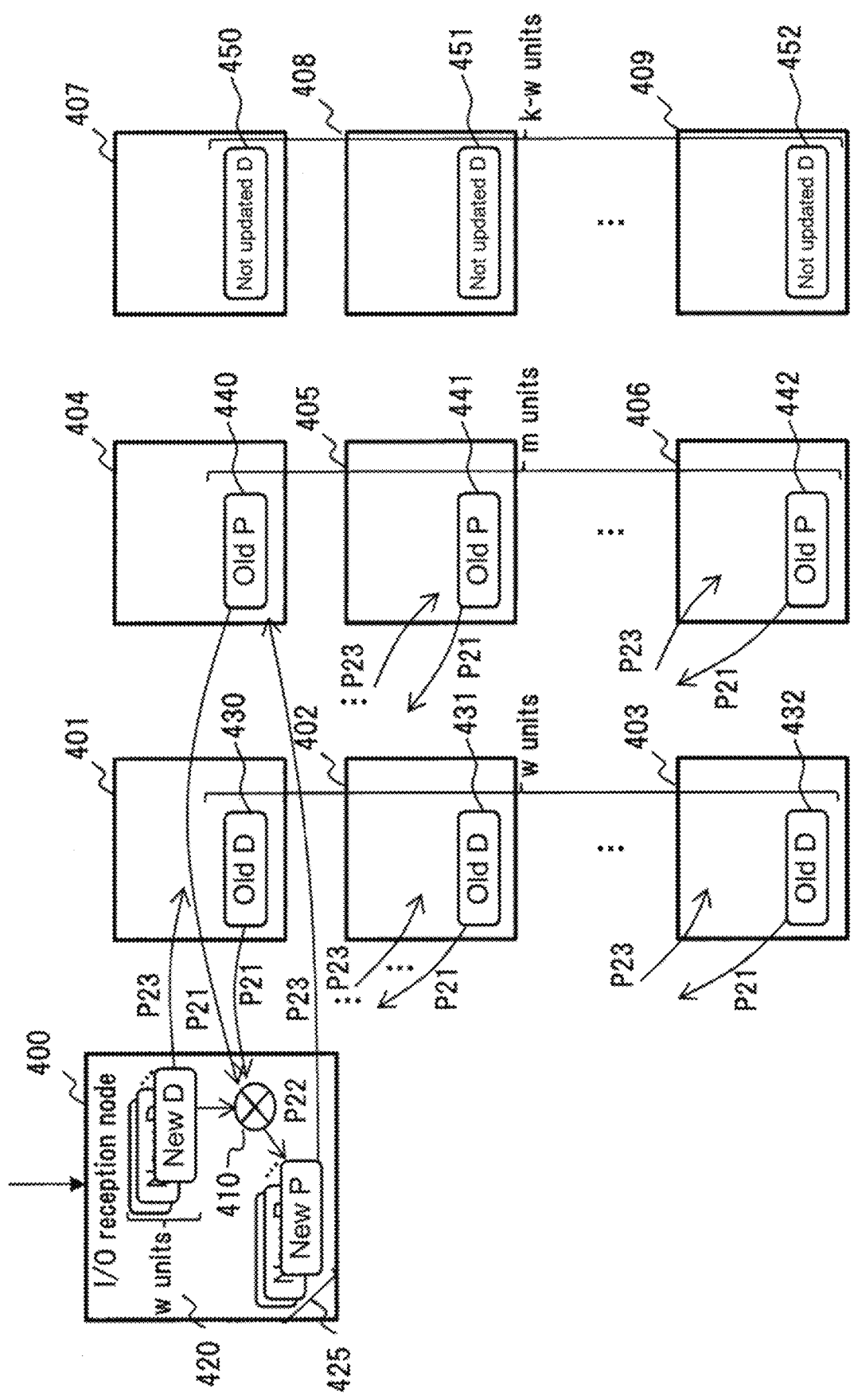
FIG. 7 is a block diagram depicting an exemplary method of calculating the amount of network traffic at the time of RMW parity calculation with the distributed storage system according to the embodiment.

FIG. 7 is a block diagram depicting an exemplary method of calculating the amount of network traffic at the time of RMW parity calculation with the distributed storage system according to the present embodiment.

In FIG. 7, it is assumed that, under the data placement condition similar to that of the storage nodes 400 to 409 in FIG. 6, the I/O reception node performs the RMW parity calculation. In this case, the storage node 400 performs I/O processing as follows:

(P21): The storage node 400 transfers w old data units 430 to 432 and m old parity units 440 to 442 to the I/O reception node.

(P22): The encoder 410 is caused to calculate m new parity units 425 from w new data units 420, from the w old data units 430 to 432, and from the m old parity units 440 to 442.

(P23): The storage node 400 transfers the w new data units 420 and the m new parity units 425 to the respective storage nodes for update operations.

When the amount of data per data unit is assumed to be 1, the amount of network traffic of the old data units 430 to 432 is w, the amount of network traffic of the old parity units 440 to 442 is m, the amount of network traffic of the new data units 420 is w, and the amount of network traffic of the new parity units 425 is m. Thus, the total network traffic over the network between the storage nodes 400 to 406 as a result of the above I/O processing amounts to w m+w+m=2w+2m.

Figure 8:
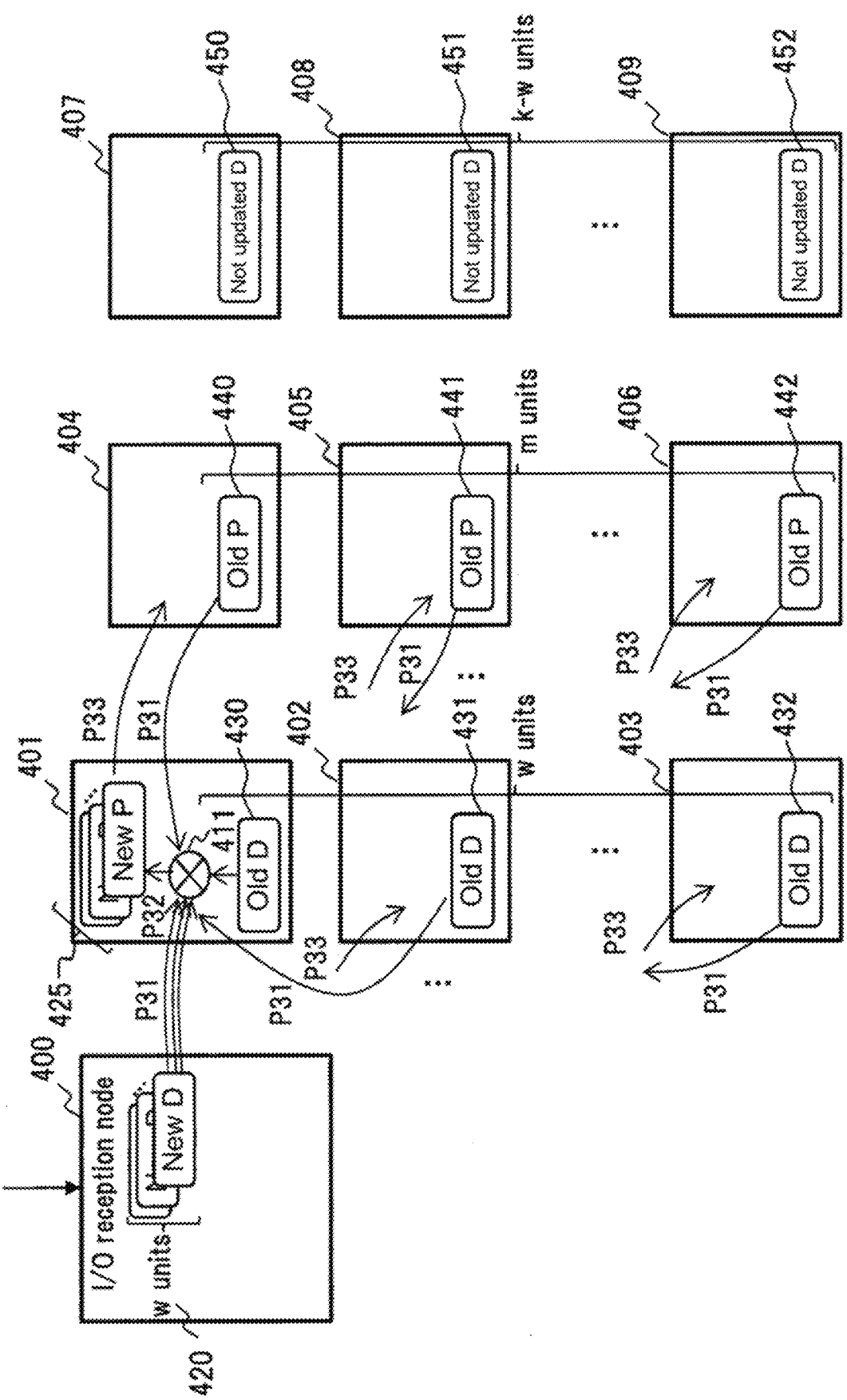
FIG. 8 is a block diagram depicting another exemplary method of calculating the amount of network traffic at the time of FEW parity calculation with the distributed storage system according to the embodiment.

FIG. 8 is a block diagram depicting another exemplary method of calculating the amount of network traffic at the time of PPM parity calculation with the distributed storage system according to the present embodiment.

In FIG. 8, it is assumed that, under the data placement condition similar to that of the storage nodes 400 to 409 in FIG. 6, a node storing an old data unit performs the RPM parity calculation. The storage node 401, which is the old data unit-storing node, includes an encoder 411. In this case, the storage node 401 performs I/O processing as follows:

(P31): The storage node 401 transfers w new data units 420, (w−1) old data units 431 to 432, and m old parity units 440 to 442 to the storage node 401. In this case, there is no need to transfer over the network one old data unit 430 stored in the storage node 401 because that old data unit 430 is read from the local drive of the storage node 401.

(P32): The encoder 411 is caused to calculate m new parity units 425 from the w new data units 420, from the (w−1) old data units 430 to 432, and from the m old parity units 440 to 442.

(P33): The storage node 401 transfers the (w−1) new data units 420 and the m new parity units 425 to the respective storage nodes for update operations. In this case, there is no need to transfer over the network one new data unit corresponding to the old data unit 430 because that new data unit is written to the local drive of the storage node 401.

When the amount of data per data unit is assumed to be 1, the total amount of data flowing over the network between the storage nodes 400 to 406 during the above I/O processing amounts to w (w−1)+m+(w−1)+m=3w+2m−2.

Figure 9:
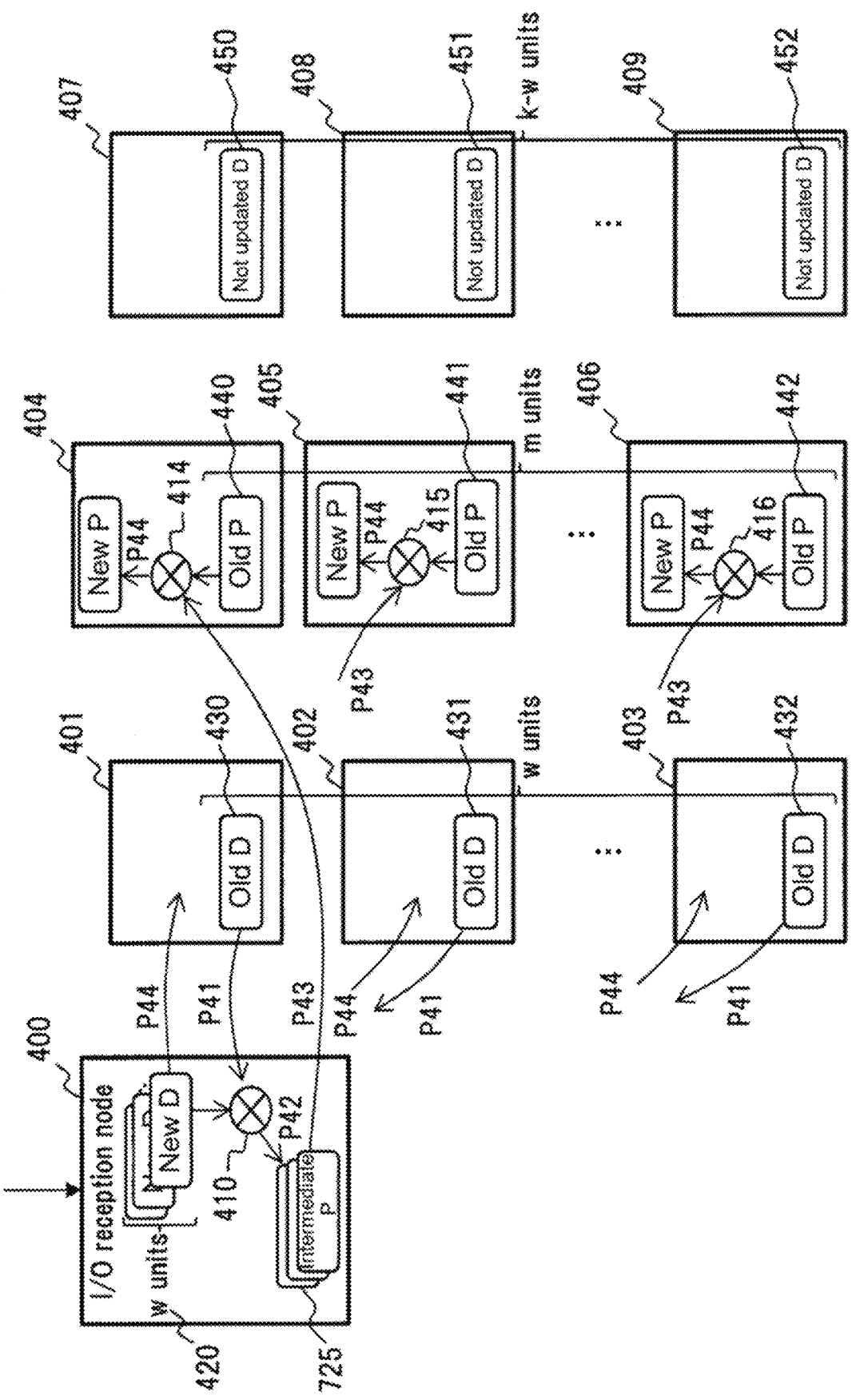
FIG. 9 is a block diagram depicting yet another exemplary method of calculating the amount of network traffic at the time of RMW parity calculation with the distributed storage system according to the embodiment.

FIG. 9 is a block diagram depicting yet another exemplary method of calculating the amount of network traffic at the time of RMW parity calculation with the distributed storage system according to the present embodiment.

In FIG. 9, it is assumed that, under the data placement condition similar to that of the storage nodes 400 to 409 in FIG. 6, the I/O reception node calculates an intermediate parity unit 725, and nodes storing old parity unit perform the RMW parity calculation using the intermediate parity unit 725. The storage nodes 404 to 406, which are the old parity unit-storing nodes, include encoders 414 to 416, respectively.

The intermediate parity is data obtained by encoding a new data unit and an old data unit. For example, the intermediate parity is acquired by calculating RS [new D1, old D1]. When the intermediate parity is assumed to be an intermediate P, the new P is obtained by calculating RS [intermediate P, old P]. In this case, the storage nodes 400 and 404 perform I/O processing as follows:

(P41): The storage nodes 400 and 404 transfer w old data units 430 to 432 to the I/O reception node.

(P42): The encoder 411 is caused to calculate m intermediate parity units 725 from w new data units 420 and from the w old data units 430 to 432.

(P43): The storage nodes 400 and 404 transfer them intermediate parity units to the corresponding old parity unit-storing nodes.

(P44): The encoders 414 to 416 in the respective old parity unit-storing nodes are caused to calculate m new parity units 425 from the m old parity units 440 to 442 and from the intermediate parity units 725 for update operations. The encoders 414 to 416 further transfer the w new data units 420 to the respective old data unit-storing nodes for update operations.

When the amount of data per data unit is assumed to be 1, the total amount of data flowing over the network between the storage nodes 400 to 406 during the above I/O processing amounts to w+m+w=2w+m. Using the intermediate parity units 725 eliminates the need for transferring the m old parity units 440 to 442 over the network. This results in a smaller amount of total network traffic than a case where the intermediate parity units 725 are not used.

The condition for permitting the use of intermediate parity is that the error correction code is capable of independently calculating multiple parity units or that there is only one parity unit (m=1). An exemplary error correction code that permits independent calculations of multiple parity units is the horizontal and vertical parity code. This is a case in which a first parity unit is generated by an exclusive-OR (XOR) operation and a second parity unit is generated by a cyclic redundancy check (CRC) code, so that two parity units are independently generated.

The timing for updates of new data units and new parity units may be implemented using the two-phase commit protocol in order to prevent data destruction due to power failure, for example.

Figure 10:
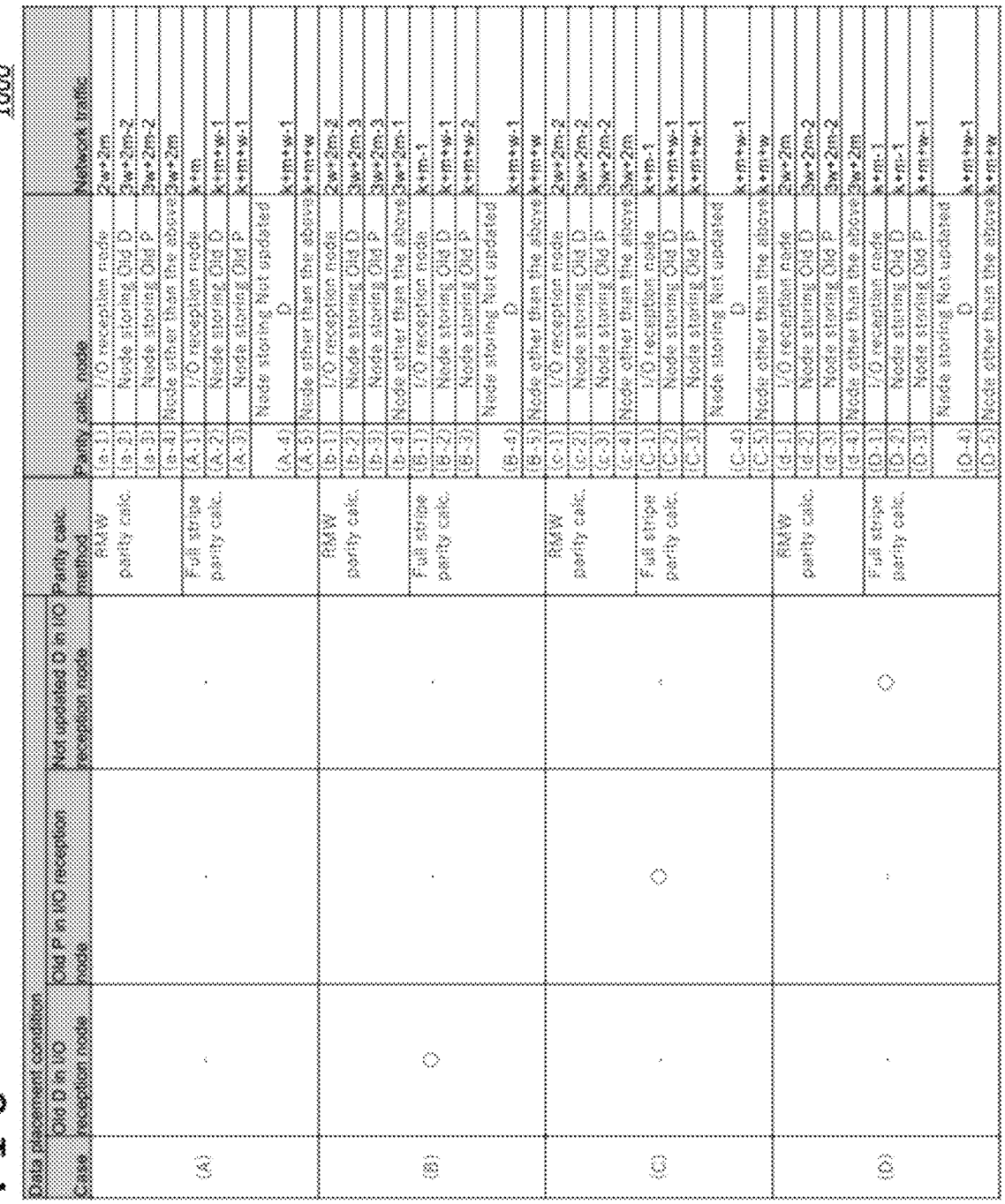
FIG. 10 is a tabular diagram listing amounts of network traffic at the time of switching between data placement conditions, between parity calculation methods, and between parity calculation nodes with the distributed storage system according to the embodiment.

FIG. 10 is a tabular diagram listing amounts of network traffic at the time of switching between data placement conditions, between parity calculation methods, and between parity calculation nodes with the distributed storage system according to the present embodiment.

In FIG. 10, it is assumed that a data unit and a parity unit already placed in storage nodes in a distributed manner are referred to as an old D and an old P, respectively, that a data unit received by the I/O reception node at the time of an update write is referred to as a new D, and that a not-updated data unit is referred to as a not-updated D. On that assumption, there are four cases of data placement conditions for the I/O reception node: (A) where there are no old D, no old P, and no not-updated D; (B) where there is an old D; (C) where there is an old P; and (D) where there is a not-updated D.

Also, there are five types of parity calculation nodes: (1) I/O reception node; (2) a node storing an old data unit; (3) a node storing an old parity unit; (4) a node storing a not-updated data unit; and (5) a node other than these nodes.

A table 1000 lists the amounts of network traffic for all combinations of the above-mentioned data placement conditions and parity calculation nodes in the case of the full-stripe parity calculation and in the case of the RMW parity calculation.

Here, the amount of network traffic in a case (A) (A-1) in the table 1000 can be calculated using the method of FIG. 6. The amount of network traffic in a case (A) (a-1) in the table 1000 can be calculated using the method of FIG. 7. The amount of network traffic in a case (A) (a-2) in the table 1000 can be calculated using the method of FIG. 8. The amount of network traffic in the other cases can also be calculated similarly.

FIG. 11 is a tabular diagram listing amounts of network traffic using intermediate parity at the time of switching between data Placement conditions as well as between parity calculation nodes with the distributed storage system according to the present embodiment.

In FIG. 11, a table 1100, as with the table 1000, lists the amounts of network traffic using intermediate parity for all combinations of the data placement conditions and parity calculation nodes in the case of the RMW parity calculation. Here, the amount of network traffic in a case (A) (a-1-int.P) in the table 1100 can be calculated using the method of FIG. 9. The amount of network traffic can also be calculated similarly using other methods.

The distributed storage 130 switches to the parity calculation method that will minimize the amount of network traffic depicted in FIGS. 10 and 11. However, since there are clearly cases where the amount of network traffic is not minimized, the determination on switching between the methods can be simplified into a determination formula.

In the case (A) above in which there is the I/O reception node, with none of old data units, old parity units, or not-updated data units as the data placement condition, for example, the determination formula involves simply determining on one of four cases (a-1), (a-2), (a-3) and (A-1) in the table 1000 that will minimize the amount of network traffic.

In the cases (a-2) and (a-3), however, the amount of network traffic is the same 3w+2m−2. That means that three amounts of network traffic need only be compared with one another. Thus, a conditional expression for switching to the full-stripe parity calculation (A-1) is given as $$2w+2m>k+m \text{ and } 3w+2m-2>k+m$$

When the above conditional expression is modified to bring w to the left side of the expression, the following expression is obtained:

$$w>(k-m)/2 \text{ and } w>(k-m+2)/3$$

From the above expression, the following switching determination formula is derived with regard to the case (A) in the table 1000 of FIG. 10:

$$w>(k-m)/2 \text{ when } k-m>=4$$

$$w>(k-m+2)/3 \text{ when } k-m<4$$

FIG. 12 is a tabular diagram listing conditions for switching between parity calculation methods with the distributed storage system according to the present embodiment.

In FIG. 12, a switching determination formula 1200 indicates the conditions for switching to the full-stripe parity calculation method in the cases (A), (B), (C) and (D) in the table 1000 of FIG. 10.

The switching determination formula 1200 indicates that, in a case where the number w of data units for an update write is larger than the value calculated from the number k of data units in a stripe and from the number m of parity units in the stripe, the full-stripe parity calculation method is selected.

FIG. 13 is a tabular diagram listing conditions for switching between parity calculation methods at the time of using intermediate parity with the distributed storage system according to the present embodiment.

In FIG. 13, a switching determination formula 1300 indicates the conditions for switching to the full-stripe parity calculation method using the intermediate parity in the cases (A), (B), (C) and (D) in the table 1100 of FIG. 11.

The switching determination formula 1300 indicates that, in a case where the intermediate parity is used at the time of RMW parity calculation and in a case where the number w of data units for the update write is larger than the value calculated from the number k of data units in the stripe, the full-stripe parity calculation method is selected.

Also, how to determine the position of the parity calculation node at the time of RMW parity calculation can be formulated into a determination formula. For example, in the case (A) in the table 1000 of FIG. 10, one of three cases (a-1), (a-2) and (a-3) can simply be selected such that the amount of network traffic will be minimized. However, in the cases (a-2) and (a-3), the amount of network traffic is the same 3w+2m−2. That means that two amounts of network traffic need only be compared with each other. Thus, the node position determination formula for determining the position of the parity calculation node in the case (a-1) is given as $$3w+2m-2>=2w+2m.$$

When the above conditional expression is modified to bring w to the left side of the expression, then w>=2. Since the number w is at least 1, the condition for determining on the case (a-2) or on the case (a-3) is w=1.

FIG. 14 is a tabular diagram listing conditions for switching between parity calculation nodes with the distributed storage system according to the present embodiment.

In FIG. 14, a node position determination formula 1400 indicates the positions of the nodes performing the RMW parity calculation in the cases (A), (B), (C) and (D) in the table 1000 of FIG. 10.

FIG. 15 is a tabular diagram listing conditions for switching between parity calculation nodes at the time of using intermediate parity with the distributed storage system according to the present embodiment.

In FIG. 15, a node position determination formula 1500 indicates the positions of the nodes performing the RMW parity calculation using the intermediate parity in the cases (A), (B), (C) and (D) in the table 1100 of FIG. 11.

In the process of switching between parity calculation options in FIG. 5, the distributed storage 130 in FIG. 1 uses, as needed, the switching determination formula 1200 in FIG. 12, the switching determination formula 1300 in FIG. 13, the node position determination formula 1400 in FIG. 14, or the node position determination formula 1500 in FIG. 15. The switching determination formula 1200, switching determination formula 1300, node position determination formula 1400, and node position determination formula 1500 can be described in the program for implementing processing of the gateway 263 in FIG. 2.

Specifically, upon receipt of a write I/O request from the client 110, the Gateway 263 running on the storage node as the I/O reception node starts an I/O processing flow with regard to the write I/O request.

Next, the gateway 263 identifies the error correction code type and the number of parity units by referencing the EC information 275 regarding the write target data specified by the write I/O request (310).

Next, in a case where the error correction code type is one in which multiple parity units can be independently calculated or in a case where the number of parity units is 1 (m=1), the gateway 263 determines on the determination formula that will use the intermediate parity in the subsequent switching determination. Otherwise the gateway 263 determines on using the usual determination formula (313).

Next, the gateway 263 then references the EC information 275 and the map information 270 to search for a match using the placement group as the key, thereby identifying the data placement information regarding the write data of interest (315).

Next, the Gateway 263 determines whether to select the full-stripe parity calculation to achieve the smallest amount of network traffic based on the data placement information, on the number k of data units, and on the number m of parity units through the use of either the usual switching determination formula 1200 in FIG. 12 or the switching determination formula 1300 using the intermediate parity in FIG. 13 (320).

Next, in a case where it is determined in step 320 that the full-stripe parity calculation will achieve the smallest amount of network traffic, the gateway 263 performs the process of the full-stripe parity calculation (325).

Meanwhile, in a case where it is determined that the RMW parity calculation will achieve the smallest amount of network traffic, the gateway 263 determines which node will perform the parity calculation through the use of either the usual node position determination formula 1400 in FIG. 14 or the node position determination formula 1500 using the intermediate parity in FIG. 15 (330).

Next, in a case where it is determined in step 330 that the I/O reception node performing the parity calculation will achieve the smallest amount of network traffic, the gateway 263 allows the I/O reception node to perform the RMW parity calculation (335).

Otherwise, the gateway 263 causes a node storing an old data unit or a node storing an old parity unit to perform the RMW parity calculation (340).

As described in the foregoing paragraphs, the above embodiment can determine on the parity calculation method that will minimize the amount of network traffic using the determination formula depending on the data placement condition and the EC condition.

Whereas the above embodiment has been described as using file data, the present invention is not dependent on the data type and can be implemented using object data or block data, for example. Although the above embodiment has been described in connection with the processes of deriving the data flow, amounts of network traffic, and determination formulas in representative cases, the embodiment is capable of deriving similarly in other cases as well.

Whereas the above embodiment has been explained regarding the flow of write I/O processing, applying the embodiment to the flow of read I/O processing causes no change therein and thus does not adversely affect the read performance.

The above embodiment has been described in connection with the methods of minimizing the cost of network traffic by assuming a flat network model. Alternatively, in a case where nodes are interconnected using network switches by cascade connection across their racks, for example, the amount of network traffic between these nodes may be calculated by multiplication with a correction factor in reference to network topology information. This accomplishes minimization of the cost of network traffic in a more sophisticated manner.

Furthermore, upon determination for switching between parity calculation nodes, the node that will perform the parity calculation may be determined by corrections based on values of the information collected regarding the free memory space in each node and the load on the CPU of each node. This makes it possible, for example, to determine on a node having a large amount of free memory space or a node with low CPU utilization rate as the parity calculation node. This provides optimization of the use of various resources of the distributed storage.

Note that the present invention is not limited to the embodiment discussed above and may also be implemented in diverse variations. For example, the embodiment above has been explained as detailed examples helping this invention to be better understood. The present invention, when embodied, is not necessarily limited to any embodiment that includes all the structures described above. Also, part of the structures of one embodiment can be replaced with the structures of another embodiment. The structures of a given embodiment can be also supplemented with the structure of another embodiment. Also, part of the structures of each embodiment can be added, deleted, or replaced by other structures. Also, the above-described structures, functions, processing units, and processing means may be implemented partially or entirely by hardware through integrated circuit design, for example.

What is claimed is:

1. A distributed storage system that includes a processor, and a plurality of nodes having a storage drive each,
a stripe being constituted by data units and by parity units for recovering the data units,
each of the units making up each stripe being stored on the storage drive of a different node,
in a case where an update write is performed on the data units of a given stripe, and
the parity units in the same stripe being updated,
the distributed storage system being configured to perform a first parity update method of calculating and updating the parity units based on all data units in the stripe having undergone the update write, and
a second parity update method of calculating and updating the parity units based on the data units having undergone the update write and on the data units and the parity units preceding the update write, and
the distributed storage system being further configured to switch between the first parity update method and the second parity update method based on an amount of data traffic between the nodes involved in the parity update,
to calculate the amount of data traffic at the time of the update write based on the number of data units in the stripe, on the number of parity units in the stripe, on the number of data units subject to the data write in the stripe, and on a type of the unit held by the node having received a request for the update write, and
to select the parity calculation method and the node that is to perform the parity calculation based on the amount of data traffic.

2. The distributed storage system according to claim 1, wherein the type of the unit held by the node having received the request for the update write is any of a data unit subject to the update write, a data unit not subject to the update write, a parity unit, and a unit other than those units.

3. The distributed storage system according to claim 1, wherein the storage node that is to perform the parity calculation is selected from among the node having received the request for the update write, a storage node storing a data unit subject to the update write, and a storage node storing the parity unit.

4. The distributed storage system according to claim 1, further switching between the parity calculation methods based on whether or not to use intermediate parity.

5. The distributed storage system according to claim 1, wherein the node having received the request for the update write calculates the amount of data traffic and selects the parity update method accordingly.

6. The distributed storage system according to claim 5, wherein the node storing the data unit and the node storing the parity unit differ depending on the stripe, and the parity update method is selected for each of the stripes.

7. A distributed storage system that includes a processor, and a plurality of nodes having a storage drive each,
a stripe being constituted by data units and by parity units for recovering the data units,
each of the units making up each stripe being stored on the storage drive of a different node,
in a case where an update write is performed on the data units of a given stripe, and
the parity units in the same stripe being updated,
the distributed storage system being configured to perform
a first parity update method of calculating and updating the parity units based on all data units in the stripe having undergone the update write, and
a second parity update method of calculating and updating the parity units based on the data units having undergone the update write and on the data units and the parity units preceding the update write, and the distributed storage system being further configured:
to switch between the first parity update method and the second parity update method based on an amount of data traffic between the nodes involved in the parity update, to switch between the parity calculation methods based on whether or not to use intermediate parity, and wherein, in a case where the intermediate parity is usable, the method of calculating the amount of data traffic with the second parity calculation method is changed depending on whether or not the intermediate parity is to be used.

* * * * *